US008806975B2

(12) United States Patent
Schneider et al.

(10) Patent No.: US 8,806,975 B2
(45) Date of Patent: Aug. 19, 2014

(54) METHOD FOR RUNNING A DRIVE LINE

(75) Inventors: Florian Schneider, Lindenberg (DE); Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 253 days.

(21) Appl. No.: 13/039,935

(22) Filed: Mar. 3, 2011

(65) Prior Publication Data
US 2011/0219900 A1 Sep. 15, 2011

(30) Foreign Application Priority Data

Mar. 10, 2010 (DE) .......................... 10 2010 002 724

(51) Int. Cl.
| B60K 20/00 | (2006.01) |
| B60W 30/188 | (2012.01) |
| B60K 17/28 | (2006.01) |
| B60W 10/30 | (2006.01) |
| F16H 61/04 | (2006.01) |
| F16H 37/04 | (2006.01) |
| F16H 3/12 | (2006.01) |
| F16H 3/093 | (2006.01) |

(52) U.S. Cl.
CPC ........ B60W 30/1888 (2013.01); *F16H 61/0403* (2013.01); B60K 17/28 (2013.01); *F16H 37/046* (2013.01); *F16H 2003/123* (2013.01); *F16H 3/126* (2013.01); *F16H 3/093* (2013.01); *B60W 10/30* (2013.01)
USPC .......................................... 74/473.1; 701/22

(58) Field of Classification Search
USPC ................................. 74/473.1, 339
See application file for complete search history.

(56) References Cited

U.S. PATENT DOCUMENTS

| 5,222,404 A | * | 6/1993 | Stine ............................... 74/335 |
| 5,560,249 A | * | 10/1996 | Nellums ......................... 74/339 |
| 5,603,242 A | * | 2/1997 | Krieger .......................... 74/335 |
| 5,927,146 A | * | 7/1999 | Dutson .......................... 74/333 |
| 6,602,161 B2 | * | 8/2003 | Hemmingsen et al. ......... 477/79 |

(Continued)

FOREIGN PATENT DOCUMENTS

| EP | 2 149 471 A1 | 2/2010 |
| WO | 2004/041576 A1 | 5/2004 |
| WO | WO 2004041576 A1 * | 5/2004 | ............. B60K 17/28 |

OTHER PUBLICATIONS

European Search Report issued in European Application No. 11154267.6, dated May 23, 2011 (including English translation of result of determination of document) (6 pages).

*Primary Examiner* — Troy Chambers
*Assistant Examiner* — Zakaria Elahmadi
(74) *Attorney, Agent, or Firm* — Brinks Gilson & Lione

(57) ABSTRACT

A method of operating a powertrain may include providing an automatic transmission disposed between a drive unit and an axle drive. One input shaft of the automatic transmission is connected by means of an operable clutch to the drive unit and an output shaft of the automatic transmission is connected to the axle drive. A transmission-side, mobile auxiliary drive is configured to couple with a transmission-side connection. The transmission-side connection point for the auxiliary drive is decoupled from the axle drive and, at least partially from the drive unit. The rotational rate of the transmission-side connection point for the auxiliary drive and the auxiliary drive are synchronized, whereby the auxiliary drive is coupled to the connection point. The transmission-side connection point for the auxiliary drive, and thereby the auxiliary drive, is coupled to the drive unit as well as the axle drive.

12 Claims, 3 Drawing Sheets

(56) References Cited

U.S. PATENT DOCUMENTS

| | | | |
|---|---|---|---|
| 6,981,931 B2 * | 1/2006 | Smith et al. | 477/70 |
| 7,300,384 B2 * | 11/2007 | Eriksson et al. | 477/180 |
| 7,691,029 B2 * | 4/2010 | Guggolz et al. | 477/174 |
| 7,905,812 B2 * | 3/2011 | Romine | 477/92 |
| 8,046,140 B2 * | 10/2011 | Romine et al. | 701/51 |
| 8,321,107 B2 * | 11/2012 | Karlsson et al. | 701/67 |
| 2008/0188349 A1 | 8/2008 | Romine | |
| 2009/0280955 A1 * | 11/2009 | Dittrich et al. | 477/79 |
| 2009/0305845 A1 * | 12/2009 | Karlsson et al. | 477/79 |
| 2010/0099536 A1 * | 4/2010 | Vennemann | 477/77 |
| 2010/0113217 A1 * | 5/2010 | Terwart et al. | 477/79 |
| 2011/0154931 A1 * | 6/2011 | Wright et al. | 74/473.1 |
| 2012/0178586 A1 * | 7/2012 | Kemler et al. | 477/79 |

\* cited by examiner

METHOD FOR RUNNING A DRIVE LINE

RELATED APPLICATIONS

The present application claims priority to German Patent Application Number 10 2010 002 724.3, filed on Mar. 10, 2010, the entirety of which is hereby incorporated by reference herein.

BACKGROUND OF THE INVENTION

1. Field of the Invention

The invention relates to a method for operating a powertrain having at least one drive unit and an automatic transmission.

2. Description of the Related Art

Automatic transmissions constructed as change transmissions having a multi-stage main transmission and a range-change gearbox located upstream or downstream of the main transmission as well as a splitter gearbox located upstream or downstream of the main transmission, have been known for some time and are preferable for use in commercial vehicles. By means of, for example, a two-stage type splitter gearbox with a gear ratio step corresponding to approximately half of a medium gear ratio step between two consecutive gear ratio stages of the main transmission, the gear ratio steps of the main transmission are halved and the total number of available gears of the change transmission is doubled. By means, for example, of a two-stage range-change gearbox having gear ratio step lying approximately at a medium gear ratio step between two consecutive gear ratio stages of the main transmission over the entire gear ratio step of the main transmission the transmission ratio spread of the change transmission is basically doubled and the total number of gears available is again doubled.

Automatic transmissions are also known that consist of only a main transmission. The splitter gearbox and the range-change gearbox are thereby optional components of an automatic transmission, whereby the main transmission of a range-change gearbox may be either upstream or downstream and/or a splitter gearbox may be upstream or downstream. Automatic transmissions having interlocking gearshift elements are to be distinguished from automatic powershift transmissions with friction locking gearshift elements.

Furthermore, it is known that powertrains of this sort in a vehicle having an automatic transmission may comprise an auxiliary drive, whereby an auxiliary drive may be referred to as a Power Take Off (PTO). A distinction is made in auxiliary drives between transmission-side and motor-side auxiliary drives on the one hand and on the other hand between stationary auxiliary drives and mobile auxiliary drives.

A motor-side auxiliary drive branches at a point directly off the drive unit, whereby a transmission-side auxiliary drive branches at a point directly off the transmission. Stationary auxiliary drives may only be operated when the vehicle is stationary, specifically when the automatic transmission is in neutral, i.e. when the power flow, or respectively, when the force flow from the drive unit to the axle drive is interrupted. Mobile auxiliary drives, on the contrary, may be operated when the transmission is engaged, i.e. when the power flow, or respectively, the force flow from the drive unit to the axle drive is not interrupted.

So far, stationary transmission-side auxiliary drives of a powertrain for a vehicle of this sort having an automatic transmission can only be engaged in a stationary vehicle, and thereby be activated. Furthermore, to date, when a transmission-side mobile auxiliary drive is engaged, or respectively, is activated, the execution of gear shifting is impeded such that it is only possible to drive in a single gear when the auxiliary drive is engaged, or respectively, is activated, and therefore within a limited speed range. Therefore it is necessarily the case that, according to the prior art, the engagement, or respectively, activation of a transmission-side, mobile auxiliary drive may only be carried out on a stationary vehicle, at a relatively low gear, specifically a start-up gear, because start-up must be possible from a stationary state.

The present invention relates to a method for operating a powertrain with an automatic transmission and a transmission-side, mobile auxiliary drive with which it is possible to engage, and thereby activate, the transmission-side, mobile auxiliary drive while the vehicle is also in motion.

From the DE 197 08 020 A1, a method is known for operating a powertrain with an automatic or semi-automatic transmission and an auxiliary drive, with which the engagement and thereby activation of an auxiliary drive is only possible when the vehicle is stationary.

SUMMARY OF THE INVENTION

Based on this, the present invention assumes the objective of creating a novel method for operating a power train of a vehicle. According to an embodiment of the invention, a method of operating a powertrain may include: providing a powertrain comprising an automatic transmission disposed between a drive unit and an axle drive, whereby one input shaft of the automatic transmission is connected by means of an operable clutch to the drive unit and an output shaft of the automatic transmission is connected to the axle drive, and whereby the powertrain furthermore comprises a transmission-side, mobile auxiliary drive configured to couple with a transmission-side connection point for the purpose of activating, or respectively, for engaging, and be decoupled with the transmission-side connection point for disengaging, wherein, in order to activate or to engage the transmission-side, mobile auxiliary drive while the motor vehicle is in motion; decoupling the transmission-side connection point for the auxiliary drive from the axle drive and at least partially decouple the transmission-side connection point for the auxiliary drive from the drive unit; synchronizing the rotational rate of the transmission-side connection point for the auxiliary drive and the rotational rate of the auxiliary drive, whereby, upon obtaining a synchronous rotational rate between the rotational rate of the connection point for the auxiliary drive and the rotational rate of the auxiliary drive, the auxiliary drive is coupled to the connection point; and coupling the transmission-side connection point for the auxiliary drive, and thereby the auxiliary drive, to the drive unit as well as the axle drive.

It is possible with this embodiment for the first time to engage and thereby activate a transmission-side, mobile auxiliary drive also while the vehicle is in motion. Hereby it is possible for the first time to operate an auxiliary drive at relatively high speeds as well, because it is not necessary to engage the auxiliary drive at a relatively low start-up gear while the vehicle is stationary.

The foregoing paragraphs have been provided by way of general introduction, and are not intended to limit the scope of the following claims.

BRIEF DESCRIPTION OF THE DRAWINGS

The embodiments described below may be more fully understood by reading the following description in conjunction with the drawings, in which.

DETAILED DESCRIPTION

The present invention relates to a method for operating a powertrain with an automatic transmission and a transmission-side, mobile auxiliary drive.

Figure 1:
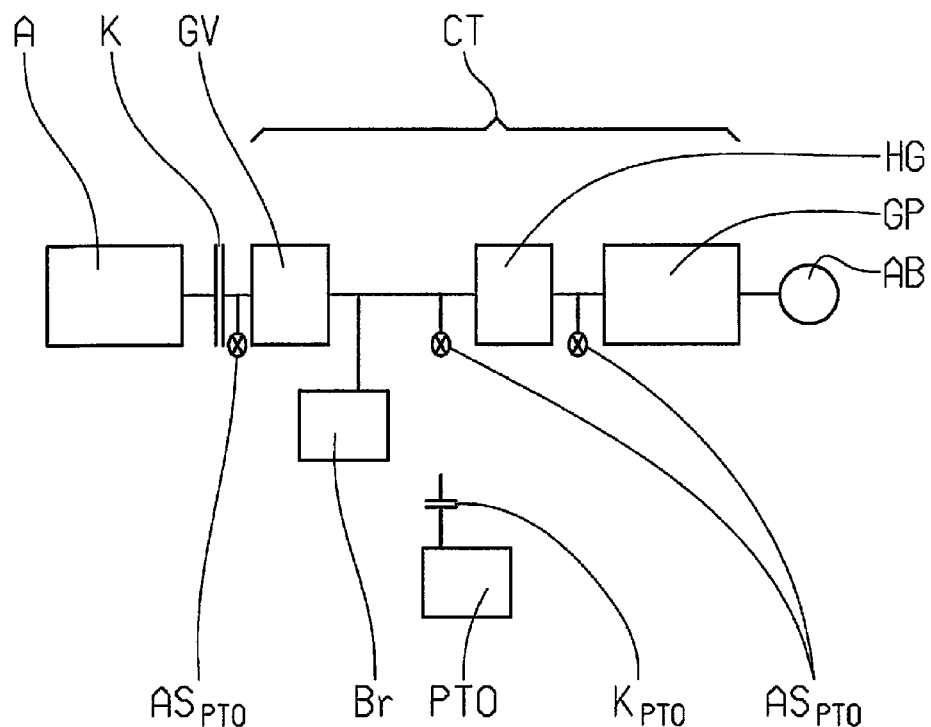
FIG. 1 is a general schematic diagram of a powertrain with which an embodiment of the present invention may be implemented.

FIG. 1 shows a highly schematically illustrated powertrain diagram with which an embodiment of a method according to the invention can be implemented, In FIG. 1, a drive unit A and an axle drive AB with an automatic transmission constructed as a change transmission CT is located between the drive unit A and the axle drive AB is illustrated.

The automatic transmission functioning as a change transmission CT in FIG. 1 has at its disposal, in accordance with FIG. 1, a main transmission, a splitter gearbox GV disposed upstream of the main transmission HG, and a range-change gearbox GP mounted downstream of the main transmission HG. Between the drive unit A and the change transmission CT is a clutch K, by means of which the drive unit A can be decoupled from the change transmission CT. Furthermore, FIG. 1 shows an operable transmission brake Br as well as a transmission-side auxiliary drive PTO having a clutch $K_{PTO}$, whereby the transmission-side auxiliary drive PTO is a mobile auxiliary drive that can be coupled at different connection points $AS_{PTO}$ to the change transmission CT. The connection points $AS_{PTO}$ are assigned to shafts of the change transmission CT.

Figure 2:
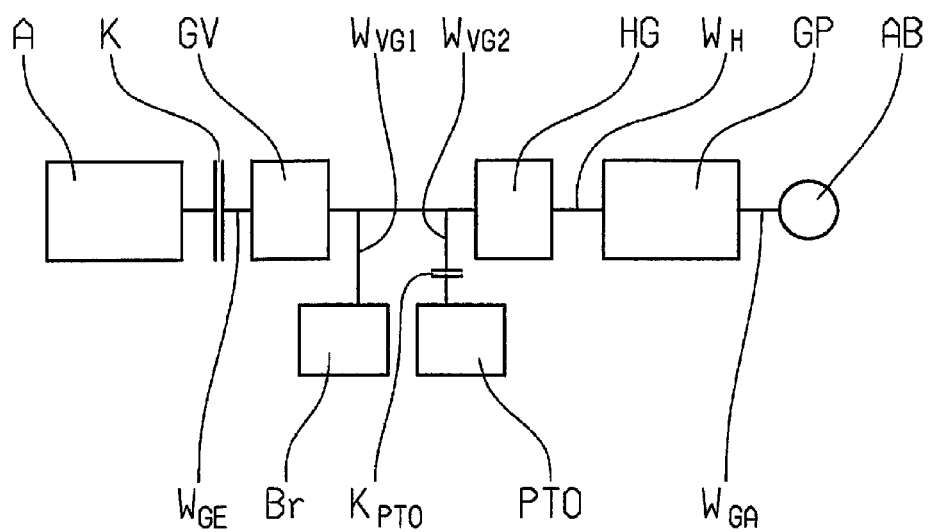
FIG. 2 illustrates another embodiment of the powertrain in FIG. 1, with which an embodiment of the present invention may be implemented.

In the case shown in FIG. 2, the transmission-side, mobile auxiliary drive PTO is coupled to one of the connection points $AS_{PTO}$ for the auxiliary drive shown in FIG. 1, specifically at a connection point which is located between the splitter gearbox GV and the main transmission AG.

Figure 3:
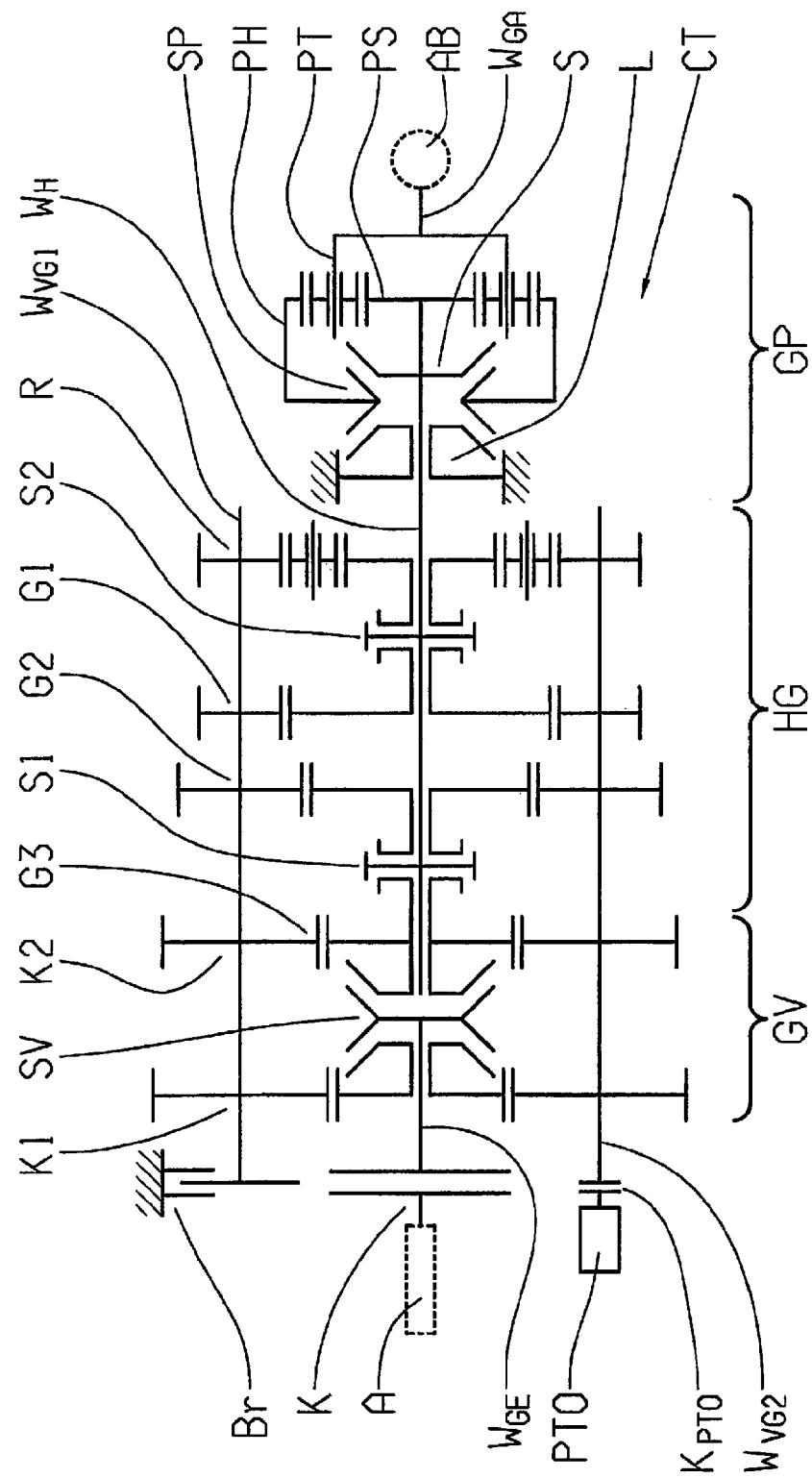
FIG. 3 illustrates the powertrain shown in FIG. 2, in greater detail.

FIG. 3 shows the powertrain of FIG. 2 in greater detail, whereby the change transmission CT shown in FIG. 3 is specifically one of the so-called AS-Tronic type change transmissions manufactured by ZF Freidrichshafen, the assignee of the present application.

The main transmission HG of the change transmission CT in FIG. 3 is designed as a direct gear transmission of a countershaft transmission and has a main shaft $W_H$ and two intermediate shafts $W_{vG1}$ and $W_{vG2}$, whereby the first intermediate shaft $W_{vG1}$ is for the operable transmission brake Br and whereby the transmission-side, mobile auxiliary drive PTO may be coupled to the second intermediate shaft $W_{vG2}$ or may be decoupled from the same.

The main transmission HG of FIG. 3 is a three-speed design, having three gears G1, G2, G3 for driving forward and a reverse gear R for driving in reverse. Idle gears of the gears G1, G2 and R are attached in a freely rotating manner to the main shaft $W_H$, and can be shifted by means of assigned dog clutches. The dedicated fixed gears are attached to the intermediate shafts $W_{vG1}$ and $W_{vG2}$ in a fixed manner. The highest gear G3 of the main transmission HG can be engaged by means of a direct clutch. The clutches for the gears G3 and G2 as well as the clutches for the gears G1 and R are in each case designed as dog clutches and contained in a common gear shift packet S1, or respectively, S2. The main transmission HG may be shifted in a non-synchronized manner.

The splitter gearbox GV of the change transmission CT in FIG. 3 is two-staged and also designed as a countershaft transmission, whereby both gear ratios K1 and K2 of the splitter gearbox GV form two shiftable input constants of the main transmission HG. By means of a lower gear ratio difference between the two gear ratios K1 and K2, the splitter gearbox GV is configured as a splitter gearbox. The idle gear of the first gear ratio K1 is attached to the input shaft in such a manner that it can rotate freely, which, by means of an operable clutch K is a linked to a combustion engine, indicated by a broken line, which is not a part of the splitter gearbox. The idle gear of the second gear ratio K2 is attached to the main shaft $W_H$ such that it can rotate freely. The fixed gears of both gear ratios K1, K2 of the splitter gearbox GV are in each case attached to intermediate shafts $W_{vG1}$ and $W_{vG2}$ of the main transmission, which are extended on the input ends, in a fixed manner. The synchronized, and as dog clutch constructed, clutches of the splitter gearbox GV are contained in a common gear shift packet.

The range-change gearbox HG of the change transmission CT downstream of the main transmission HG in FIG. 3 is also two-staged, but in a planetary design with a simple planetary gear assembly. The sun gear PS is connected in a fixed manner to the main shaft $W_H$ of the main transmission HG, extended at the output end. The planet carrier PT is connected in a fixed manner to the output shaft $W_{GA}$ of the change transmission CT, which in turn is linked to an axle drive AB indicated by a broken line. The ring gear PH is linked to a gear shift packet SP with two synchronized clutches in the form of dog clutches, by means of which the range-change gearbox GP can be shifted alternately between a low speed gear established by means of the connection of the ring gear PH to a stationary housing part and a high speed gear established by means of the connection of the ring gear PH to the main shaft $W_H$, or respectively, to the sun gear PS. The range-change gearbox can be shifted in a synchronized manner.

The present invention relates thereby to such details by means of which, with a powertrain having an automatic transmission and a transmission-side, mobile auxiliary drive PTO, it is possible to engage and thereby activate the auxiliary drive PTO while the vehicle is in motion.

At this point it should be pointed out that the method according to the invention is not limited to the applications of the powertrain shown in FIGS. 1-3, but rather also for other powertrain configurations having an automatic transmission and a transmission-side, mobile auxiliary drive where it can be implemented.

Figure 4:
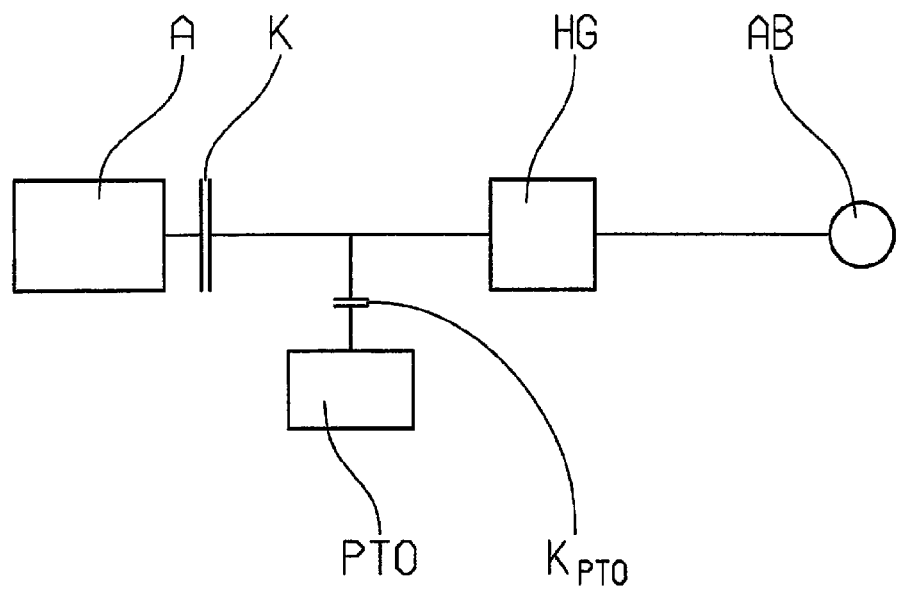
FIG. 4 illustrates another powertrain with which an embodiment of the present invention may be implemented.

In this manner, the embodiment of the invention can also be implemented with the powertrain in FIG. 4, whereby the automatic transmission is solely a main transmission HG, comprising neither a splitter gearbox GV nor a range-change gearbox GP.

Figure 5:
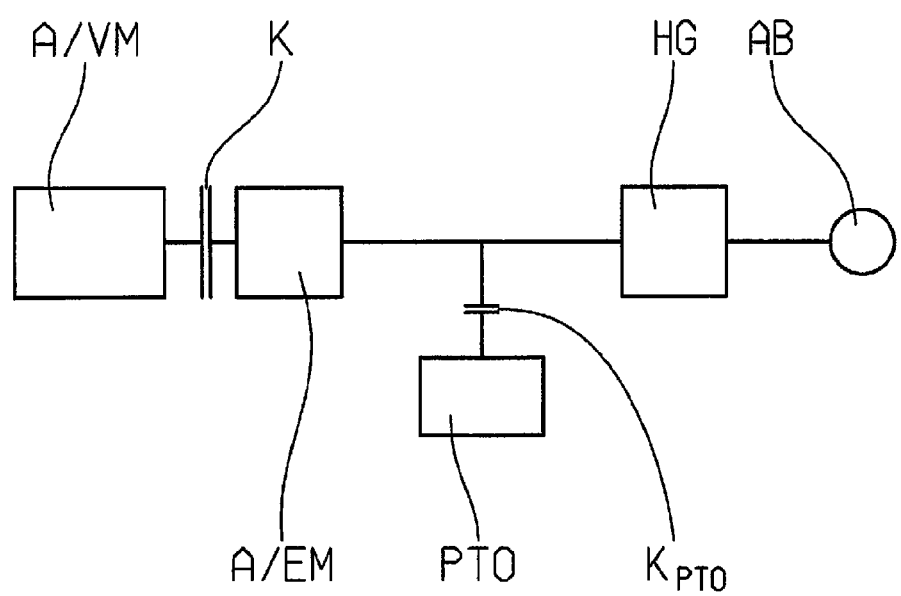
FIG. 5 illustrates yet another powertrain with which an embodiment of the present invention may be implemented.

Furthermore, the method according to an embodiment the invention can also be implemented with the powertrain of FIG. 5, with which the automatic transmission, as with that in FIG. 4, also comprises solely a main transmission HG, wherein the drive unit A, however, is a hybrid drive, comprising, in addition to a combustion engine VM, an electric motor EM, which, according to FIG. 5 is downstream of the clutch K.

Therefore, in order to enable an activation, or engagement, of the transmission-side, mobile auxiliary transmission PTO in a powertrain with an automatic transmission and a transmission-side mobile auxiliary transmission PTO while the vehicle is in motion, first the transmission-side connection point for the transmission-side, mobile auxiliary transmission PTO is decoupled from the axle drive AB and at least partially decoupled from the drive unit A.

In order to decouple the transmission-side connection point for the transmission-side, mobile auxiliary drive PTO from the axle drive AB, one of the respective connection points for the transmission component located downstream of the auxiliary drive PTO, between the respective connection point and the axle drive AB is shifted to a neutral setting. This occurs, particularly in the embodiment of FIGS. 2 and 3, by means of shifting the main transmission HG to a neutral setting. Alternatively, the range-change gearbox can also be shifted to a neutral setting. In the embodiments of FIGS. 4 and 5, the automatic transmissions of which are comprised solely of a main transmission HG, the main transmission HG is shifted to a neutral setting for this purpose. Next, when the auxiliary drive PTO of the powertrain in FIG. 1 is connected at the connection point $AS_{PTO}$ between the clutch K and the splitter gearbox GV, then the splitter gearbox GV can also be shifted to a neutral setting for this purpose.

In order to at least partially decouple the respective transmission-side connection point $AS_{PTO}$ for the auxiliary drive PTO from the drive unit A, at least the clutch K is disengaged, whereby, for the embodiments of FIGS. 1-4, the connection points for the auxiliary drive PTO are fully disengaged from the drive unit A and in the embodiment of FIG. 5 the same is solely disengaged from the combustion engine VM of the drive unit A, whereby it remains coupled to the electric motor EM of the drive unit.

After the transmission-side connection point for the auxiliary drive PTO is decoupled from the axle drive AB and at least partially decoupled from the drive unit A, the rotational rate of the transmission-side connection point for the auxiliary drive PTO and the rotational rate of the auxiliary drive PTO are subsequently synchronized, whereby when synchronization has been obtained, the auxiliary drive PTO is coupled to the respective connection point.

For the execution of this synchronization, i.e., to obtain the synchronized rotational rate between the rotational rate of the connection point for the auxiliary drive PTO and the rotational rate for the auxiliary drive PTO, a device is used which affects either the transmission-side connection point for the auxiliary drive or the auxiliary drive. In this manner, in the embodiments of FIGS. 1-3, the rotational rate of the connection point for the auxiliary drive PTO can be influenced by the transmission brake Br. In this manner, the rotational rate of the second intermediate shaft $W_{VG2}$ can be reduced in order to obtain the synchronous rotational rate by means of the transmission brake Br, which affects the first intermediate shaft $W_{VG1}$. Alternatively, the rotational rate of the intermediate shaft $W_{VG2}$, and thereby the rotational rate of the connection point for the auxiliary drive PTO, can be influenced through the clutch K and the drive unit A, whereby, for this purpose however, in particular, an idle speed as well as a governed speed for the drive unit A must be taken into consideration as influence limits.

With the powertrain of FIG. 5, the synchronous rotational rate between the connection point for the auxiliary drive PTO and the rotational rate of the auxiliary drive PTO can be adjusted by means of the electric motor EM of the drive unit A.

With the powertrain of FIG. 4, the synchronous rotational rate between the rotational rate of the connection point for the auxiliary drive as well as the rotational rate of the auxiliary drive PTO can be obtained in particular by means of the neutral setting of the main transmission HG as well as by disengaging the clutch K, i.e. in that the connection point for the auxiliary drive PTO is slowed by means of drag torque. In this case the synchronization of a gear with a corresponding gear ratio can be used to selectively influence the rotational rate of the connection point for the auxiliary drive PTO.

Upon obtaining the synchronous rotational rate between the rotational rate of the connection point for the auxiliary drive, as well as the rotational rate of the auxiliary drive, the auxiliary drive PTO is coupled with the respective connection point of the transmission, whereby subsequently the transmission-side connection point of the auxiliary drive PTO, and thereby the auxiliary drive PTO, is coupled with the drive unit A as well as the axle drive AB.

For this, the transmission-side connection point for the auxiliary drive PTO and thereby the auxiliary drive PTO can first be coupled with the drive unit A and then subsequently with the axle drive AB.

On the other hand it is also possible for this purpose to couple the connection point for the auxiliary drive PTO and thereby the auxiliary drive PTO first with the axle drive AB and then subsequently with the drive unit A.

To engage the transmission-side connection point for the auxiliary drive PTO with the axle drive AB, a gear corresponding to the current driving speed is applied in automatic transmissions, whereby with this gear, either it the gear previously applied, which was the gear applied in the automatic transmission before the coupling procedure of the auxiliary drive PTO, or an appropriately corresponding gear. For this purpose, with the embodiment of FIGS. 2 and 3 it may, if applicable, be necessary to bring the intermediate shaft $W_{VG2}$ and thereby the gear to be applied to a rotational rate aligned with the driving speed.

To couple the transmission-side connection point for the auxiliary drive PTO, and to thereby couple the transmission-side connection point for the auxiliary drive PTO with the drive unit A, or respectively, with the combustion engine VM of the drive unit A, the clutch K is engaged.

With the present invention a method is proposed, by means of which, with a powertrain having an automatic transmission as well as a transmission-side, mobile auxiliary drive, the auxiliary drive PTO is engaged while the vehicle is in motion and can thereby be activated. For this purpose the corresponding connection point for the auxiliary drive is first decoupled from the axle drive AB and at least partially from the drive unit A, in order that subsequently a synchronization between the rotational rate of the connection point of the auxiliary drive PTO and the rotational rate of the auxiliary drive PTO can be obtained.

Because the auxiliary drive typically is stationary prior to being engaged, or respectively, being activated, the synchronous rotational rate between the rotational rate of the connection point for the auxiliary drive as well as the rotational rate of the auxiliary drive PTO is typically at a stationary state of the auxiliary drive, whereby the rotational rate is zero.

It is however possible, if the rotational rates of the auxiliary drive PTO and the connection point can be measured or calculated, to use a synchronous rotational rate between the connection point for the auxiliary drive PTO and the rotational rate of the auxiliary drive PTO which deviates from the stationary state, or respectively, deviates from zero.

The adjustment of the synchronous rotational rate is obtained, as already stated, by means of an appropriate device, whereby the device may, for example, be the transmission brake Br. Likewise, the synchronization may be obtained by means of an electric motor EM, through the interaction of the drive unit A and the clutch K as well as by means of synchronization within the transmission.

Upon obtaining a synchronous state the auxiliary drive PTO is coupled with its respective connection point and subsequently the powertrain is engaged in that both a connection to the axle drive AB as well as to the drive unit A is established.

In order, therefore, to engage a transmission-side, mobile auxiliary drive PTO while the vehicle is in motion, the automatic transmission, preferably constructed as a change transmission, is to be shifted to neutral at least at one transmission component downstream of the connection point of the auxiliary drive PTO in order that the rotational rate of the connection point for the auxiliary drive can be influenced without inducing an unintended acceleration or deceleration of the vehicle.

Once this is accomplished, the necessary synchronous state, or respectively, the synchronous rotational rate, is obtained, after which the auxiliary drive is coupled to its respective connection point and subsequently the powertrain is re-engaged.

According to an advantageous development of this embodiment it is possible that the above method for coupling a transmission-side, mobile auxiliary drive PTO with its respective connection point on the transmission while the vehicle is in motion is only enabled when the slope of the driving surface that the vehicle is being driven on is less than an applicable threshold. In this case, on large inclines or slopes, where it is possible for the vehicle to accelerate or decelerate too quickly, to override the engaging of the auxiliary drive PTO. For this, a slope value for the driving surface is used, determined either through measurements or calculations.

Furthermore, it is possible for the above engaging or activating of the auxiliary drive to only be enabled if the effective torque is less than an applicable threshold value.

In order to ensure a reproducible performance, in this context it is preferably intended that the driver receive an indication of whether or not an auxiliary drive can be engaged as a rule while the vehicle is in motion. As already stated, the engaging of the auxiliary drive PTO is overridden in particular when a driving surface slope and/or powertrain torque is greater than an applicable threshold value.

While preferred embodiments have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the features described above are not necessarily the only features of the invention, and it is not necessarily expected that all of the described features will be achieved with every embodiment of the invention.

The invention claimed is:

1. A method for operating a powertrain of a motor vehicle, comprising:
    providing a powertrain comprising an automatic transmission disposed between a drive unit and an axle drive, whereby one input shaft of the automatic transmission is connected by means of an operable clutch to the drive unit and an output shaft of the automatic transmission is connected to the axle drive, and whereby the powertrain furthermore comprises a transmission-side, mobile auxiliary drive configured to couple with a transmission-side connection point for the purpose of activating, or respectively, for engaging, and be decoupled with the transmission-side connection point for disengaging,
    wherein, in order to activate or to engage the transmission-side, mobile auxiliary drive while the motor vehicle is in motion;
    decoupling the transmission-side connection point for the auxiliary drive from the axle drive and at least partially decoupling the transmission-side connection point for the auxiliary drive from the drive unit;
    synchronizing a rotational rate of the transmission-side connection point for the auxiliary drive and a rotational rate of the auxiliary drive, whereby, upon obtaining a synchronous rotational rate between the rotational rate of the connection point for the auxiliary drive and the rotational rate of the auxiliary drive, the auxiliary drive is coupled to the connection point;
    coupling the transmission-side connection point for the auxiliary drive, and thereby the auxiliary drive, to the drive unit as well as the axle drive;
    wherein in order to couple the transmission-side connection point for the auxiliary drive with the axle drive, synchronizing a rotational rate of a gear in the automatic transmission with a rotational rate of the axle drive and engaging the gear, wherein the rotational rate of the axle drive is aligned with the current driving speed.

2. The method according to claim 1, wherein, in the act of decoupling, at least one transmission component positioned downstream of the transmission-side connection points for the auxiliary drive, between the connection point and the axle drive, is shifted to a neutral setting and the clutch upstream of the connection point for the auxiliary drive is disengaged.

3. The method according to claim 2, wherein a main transmission of the automatic transmission, which is disposed downstream of the transmission-side connection point for the auxiliary drive, is shifted to a neutral setting.

4. The method according to claim 2, wherein a range-change gearbox or splitter gearbox of the automatic transmission, which is disposed downstream of the transmission-side connection point for the auxiliary drive and is disposed upstream or downstream of a main transmission, is shifted to a neutral setting.

5. The method according to claim 4, wherein, in the act of synchronizing, the synchronous rotational rate between the rotational rate of the connection point for the auxiliary drive and the rotational rate of the auxiliary drive is aligned by means of a device that acts on either the transmission-side connection point for the auxiliary drive or on the auxiliary drive.

6. The method according to claim 5, wherein the rotational rate of the transmission-side connection point for the auxiliary drive is influenced by means of a transmission brake or an electric motor.

7. The method according to claim 5, wherein the rotational rate of the auxiliary drive is influenced by means of the clutch or the drive unit.

8. The method according to claim 1, wherein, in the act of coupling, the transmission-side connection point for the auxiliary drive is first coupled with the drive unit and then subsequently the transmission-side connection point for the auxiliary drive is coupled with the axle drive.

9. The method according to claim 1, wherein, in the act of coupling, the transmission-side connection point for the auxiliary drive is first coupled with the axle drive and then subsequently coupled with the drive unit.

10. The method according to claim 1, wherein, to couple the transmission side connection point for the auxiliary drive with the drive unit, the clutch is engaged.

11. The method according to claim 10, wherein the activation, or respectively, the engaging of the transmission-side, mobile auxiliary drive while the motor vehicle is in motion is only enabled if the slope of a driving surface for the motor vehicle is less than an applicable threshold value.

12. The method according to claim 11, wherein, in the activation, or respectively, the engaging of the transmission-side, mobile auxiliary drive while the motor vehicle is in motion, is only enabled if the powertrain torque is less than an applicable threshold value.

* * * * *